United States Patent
Lin et al.

(10) Patent No.: US 12,224,080 B2
(45) Date of Patent: *Feb. 11, 2025

(54) HIGHLY CONDUCTING AND TRANSPARENT FILM AND PROCESS FOR PRODUCING SAME

(71) Applicant: Global Graphene Group, Inc., Dayton, OH (US)

(72) Inventors: Yi-jun Lin, Taoyuan (TW); Aruna Zhamu, Springboro, OH (US); Bor Z. Jang, Centerville, OH (US)

(73) Assignee: Global Graphene Group, Inc., Dayton, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 16/654,122

(22) Filed: Oct. 16, 2019

(65) Prior Publication Data

US 2020/0051709 A1    Feb. 13, 2020

Related U.S. Application Data

(63) Continuation of application No. 13/815,316, filed on Feb. 21, 2013, now Pat. No. 10,468,152.

(51) Int. Cl.
*H01B 1/04* (2006.01)
*B82Y 30/00* (2011.01)
*G06F 3/041* (2006.01)

(52) U.S. Cl.
CPC ............ *H01B 1/04* (2013.01); *B82Y 30/00* (2013.01); *G06F 3/041* (2013.01);
(Continued)

(58) Field of Classification Search
CPC ............ C01B 2204/00; C01B 2204/02; H01L 29/1606; H01L 29/66015; H01L 10/005; H01L 2924/13088
See application file for complete search history.

(56) References Cited

U.S. PATENT DOCUMENTS 2,798,878 A    7/1957  Hummers
5,387,444 A    2/1995  Bachmann
(Continued)

FOREIGN PATENT DOCUMENTS

| CN | 102560415 | * | 7/2012 |
| WO | 2011001961 A1 | | 1/2011 |
| WO | 2011112589 A1 | | 9/2011 |

OTHER PUBLICATIONS

U.S. Appl. No. 13/815,729 Final Office Action dated Dec. 13, 2019, 18 pages.
(Continued)

*Primary Examiner* — Jennifer A Steele

(57) ABSTRACT

An optically transparent and electrically conductive film composed of metal nanowires or carbon nanotubes combined with pristine graphene with a metal nanowire-to-graphene or carbon nanotube-to-graphene weight ratio from 1/99 to 99/1, wherein the pristine graphene is single-crystalline and contains no oxygen and no hydrogen, and the film exhibits an optical transparence no less than 80% and sheet resistance no higher than 300 ohm/square. This film can be used as a transparent conductive electrode in an electro-optic device, such as a photovoltaic or solar cell, light-emitting diode, photo-detector, touch screen, electro-wetting display, liquid crystal display, plasma display, LED display, a TV screen, a computer screen, or a mobile phone screen.

14 Claims, 6 Drawing Sheets

(52) U.S. Cl.
CPC ............... *G06F 2203/04103* (2013.01); *Y10T 428/31678* (2015.04); *Y10T 442/10* (2015.04)

(56) References Cited

U.S. PATENT DOCUMENTS

| | | |
|---|---|---|
| 5,474,808 A | 12/1995 | Aslam |
| 5,540,384 A | 7/1996 | Erickson et al. |
| 5,582,348 A | 12/1996 | Erickson et al. |
| 6,349,668 B1 | 2/2002 | Sun et al. |
| 6,583,071 B1 | 6/2003 | Weidman et al. |
| 7,071,258 B1 | 7/2006 | Jang et al. |
| 7,824,651 B2 | 11/2010 | Zhamu et al. |
| 8,018,563 B2 | 9/2011 | Jones et al. |
| 8,226,801 B2 | 7/2012 | Zhamu et al. |
| 8,871,296 B2 | 10/2014 | Zhamu et al. |
| 2003/0033948 A1 | 2/2003 | Buono et al. |
| 2005/0271574 A1 | 12/2005 | Jang et al. |
| 2007/0212538 A1 | 9/2007 | Niu |
| 2007/0284557 A1 | 12/2007 | Gruner et al. |
| 2008/0012163 A1 | 1/2008 | Andrews et al. |
| 2008/0048152 A1 | 2/2008 | Jang et al. |
| 2008/0048996 A1 | 2/2008 | Hu et al. |
| 2008/0248275 A1 | 10/2008 | Jang et al. |
| 2008/0259262 A1 | 10/2008 | Jones et al. |
| 2008/0314314 A1 | 12/2008 | Erickson et al. |
| 2009/0017211 A1 | 1/2009 | Gruner et al. |
| 2011/0014385 A1 | 1/2011 | Ahonen et al. |
| 2011/0017585 A1* | 1/2011 | Zhamu .................. C01B 32/19 204/157.42 |
| 2011/0033631 A1 | 2/2011 | Malshe et al. |
| 2011/0199334 A1 | 8/2011 | Hwang et al. |
| 2011/0281070 A1 | 11/2011 | Mittal et al. |
| 2012/0094090 A1 | 4/2012 | Yamazaki et al. |
| 2012/0116094 A1 | 5/2012 | Swager et al. |
| 2012/0197051 A1* | 8/2012 | Tour .......................... C07C 1/32 977/788 |
| 2012/0270054 A1 | 10/2012 | Hong et al. |
| 2013/0048339 A1* | 2/2013 | Tour ................ H01L 31/022491 174/126.1 |
| 2013/0056244 A1* | 3/2013 | Srinivas .................. H05K 1/09 174/250 |
| 2013/0130037 A1 | 5/2013 | Bol et al. |
| 2013/0329366 A1* | 12/2013 | Wang ................. H05K 7/20963 977/734 |
| 2014/0079932 A1 | 3/2014 | Aksay et al. |
| 2014/0124176 A1* | 5/2014 | Zhamu .................. H01L 23/373 165/133 |
| 2014/0190676 A1 | 7/2014 | Zhamu et al. |
| 2014/0272199 A1 | 9/2014 | Lin et al. |
| 2014/0313562 A1 | 10/2014 | Ruoff et al. |
| 2015/0311363 A1* | 10/2015 | Park ....................... B82Y 10/00 136/263 |

OTHER PUBLICATIONS

U.S. Appl. No. 16/389,254 Final Office Action dated May 21, 2020, 8 pages.
U.S. Appl. No. 16/389,254 Nonfinal Office Action dated Feb. 6, 2020, 9 pages.
Ahn et al., "Improved Thermal Oxidation Stability of Solution-Processable Silver Nanowire Trans. Electrode by RGO" ACS Applied Materials & Interfaces (2012) vol. 4, No. 12, pp. 6410-6414.
Bae et al., "Roll-to-roll production of 30-inch graphene films for transparent electrodes" Nature Nanotechnology (2010) vol. 5, pp. 574-578.
Chen et al., "Flexible Silver Nanowire Meshes for High-Efficiency Microtextured Organic-Silicon Hybrid Photovoltaics" ACS App. Mat.s & Interfaces (2012) vol. 12, pp. 6857-6864.
De et al., "Are There Fundamental Limitations on the Sheet Resistance and Transparence of Thin Graphene Films?" ACS Nano (2010) vol. 4, No. 5, pp. 2713-2720.
De et al., "Silver Nanowire Networks as Flexible, Transparent, Conducting Films: Extremely High DC to Optical Conductivity Ratios" ACS Nano (2009) vol. 3, pp. 1767-1774.
Eda et al., "Large-Area Ultrathin Films of Reduced Graphene Oxide as a Transparent and Flexible Electronic Material" Nature Nanotechnology (2008) vol. 3, pp. 270-274.
Hecht et al., "Emerging Transparent Electrodes Based on Thin Films of Carbon Nanotubes, Graphene, and Metallic Nanostructures" Adv. Mater. (2011) vol. 23, pp. 1482-1513.
Hu et al., "Percolation in Transparent and Conducting Carbon Nanotube Networks" Nano Letters (2004) vol. 4, pp. 2513-2517.
Kholmanov et al., "Improved Electrical Conductivity of Graphene Films Integrated with Metal Nanowires" Nano Letters (2012) vol. 12, No. 11, pp. 5679-5683.
Kim et al., "Large-Scale Pattern Growth of Graphene Films for Stretchable Transparent Electrodes" Nature (2009) vol. 457, pp. 706-710.
Kim et al., "Electrostatic Spray Depo. of Highly Trans. Silver Nanowire Electrode on Flexible Substrate" ACS Appl. Mater. Interf. (2013) vol. 5, pp. 788-794.
Lee et al., "Solution-Processed Metal Nanowire Mesh Transparent Electrodes" Nano Letters (2008) vol. 8, No. 2, pp. 689-692.
Li et al., "Transfer of Large-Area Graphene Films for High-Performance Transparent Conductive Electrodes" Nano Letters (2009) vol. 9, pp. 4359-4363.
Park et al., "Transparent Conductive Single Wall Carbon Nanotube Network Films for Liquid Crystal Displays" ECS Solid State Letters (2012) pp. R31-R33.
Pasquarelli et al., "Solution processing of transparent conductors: from flask to film" Chem Soc. Rev. (2011) vol. 40, pp. 5406-5441.
PCT/US14/24604 International Search Report dated Sep. 9, 2014.
Rathmell, "The Synthesis and Coating of Long, Thin Copper Nanowires to Make Flexible, Transparent Conducting Films on Plastic Substrates" Adv. Mater. (2011) vol. 23, pp. 4798-4803.
Reina et al., "Large Area, Few-Layer Graphene Films on Arbitrary Substrates by Chemical Vapor Deposition" Nano Letters (2009) vol. 9, pp. 30-35.
Tenent et al., "Ultrasmooth, Large-Area, High-Uniforming, Conductive Transparent Single-Walled-Carbon-Nanotube Films for Photovoltaics Produced by Ultrasonic Spraying" Adv. Mater. (2009) vol. 21, pp. 3210-3216.
Tung et al., "Low-Temp. Solution Processing of Graphene-Carbon Nanotube Hybrid Materials for High-Performance Transparent Cond." Nano Letters (2009) vol. 9, pp. 1949-1955.
U.S. Appl. No. 13/815,316 Final Office Action dated Jul. 9, 2018, 35 pages.
U.S. Appl. No. 13/815,316 Nonfinal Office Action dated Dec. 13, 2018, 21 pages.
U.S. Appl. No. 13/815,729 Final Office Action dated Aug. 25, 2017, 28 pages.
U.S. Appl. No. 13/815,729 Final Office Action dated Mar. 31, 2015, 20 pages.
U.S. Appl. No. 13/815,729 Final Office Action dated Oct. 3, 2018, 19 pages.
U.S. Appl. No. 13/815,729 Nonfinal Office Action dated Dec. 3, 2014, 13 pages.
U.S. Appl. No. 13/815,729 Nonfinal Office Action dated Jul. 30, 2019, 22 pages.
U.S. Appl. No. 13/815,729 Nonfinal Office Action dated Mar. 21, 2018, 24 pages.
U.S. Appl. No. 13/815,729 Nonfinal Office Action dated May 2, 2017, 21 pages.
U.S. Appl. No. 15/353,906 Nonfinal Office Action dated Jun. 14, 2018, 8 pages.
Wang et al., "Transparent, Conductive Graphene Electrodes for Dye-Sensitized Solar Cells" Nano Letters (2008) vol. 8, pp. 323-327.
Wu et al., "Organic Light-Emitting Diodes on Solution-Processed Graphene Transparent Electrodes" ACS Nano (2010) vol. 4, pp. 43-48.
Wu et al., "Transparent, Conductive Carbon Nanotube Films" Science (2004) vol. 305, No. 5688, pp. 1273-1276.

(56) References Cited

OTHER PUBLICATIONS www.Sono-tek.com (screen captures from Feb. 7, 2012 of Sono-tek website including www.sono-tek.com/graphene-coatings/ and www.sono-tek.com/carbon-nanotubes-cnts-nanowires/as dated by the Internet Archive Wayback Machine).

Yun et al., "Transparent conducting films based on graphene oxide/silver nanowire hybrids with high flexibility" Synthetic Metals (2012) vol. 162, pp. 1364, 1368.

* cited by examiner

HIGHLY CONDUCTING AND TRANSPARENT FILM AND PROCESS FOR PRODUCING SAME

CROSS REFERENCE TO RELATED APPLICATIONS

The present application is a continuation of U.S. patent application Ser. No. 13/815,316 filed Feb. 21, 2013, the contents of which are hereby incorporated by reference for all purposes.

FIELD

The present disclosure relates generally to the field of transparent conductive electrodes for solar cell, photo-detector, light-emitting diode, touch screen, and display device applications and, more particularly, to a pristine graphene-based hybrid film with a combination of exceptional optical transparency and high electrical conductivity (or low sheet resistance).

BACKGROUND

The following references are related to the art of "transparent and conductive electrodes":

1. Hu, L.; Hecht, D. S.; Gruner, G. "Percolation in Transparent and Conducting Carbon Nanotube Networks," Nano Lett. 2004, 4, 2513-2517.
2. Zhuangchun Wu, et al. "Transparent, Conductive Carbon Nanotube Films," Science 27 Aug. 2004: Vol. 305 no. 5688 pp. 1273-1276. DOI: 10.1126/science.1101243.
3. Hong-Gyu Park, Min-Ji Lee, Kunnyun Kim and Dae-Shik Seo, "Transparent Conductive Single Wall Carbon Nanotube Network Films for Liquid Crystal Displays, ECS Solid State Lett. 2 Oct. 2012: R31-R33.
4. Jung-Yong Lee, Stephen T. Connor, Yi Cui, and Peter Peumans, "Solution-Processed Metal Nanowire Mesh Transparent Electrodes," Nano Lett., 2008, 8 (2), pp 689-692.
5. De, S.; Higgins, T. M.; Lyons, P. E.; Doherty, E. M.; Nirmalraj, P. N.; Blau, W. J.; Boland, J. J.; Coleman, J. N. "Silver Nanowire Networks as Flexible, Transparent, Conducting Films: Extremely High DC to Optical Conductivity Ratios," ACS Nano, 2009, 3, 1767-1774.
6. Ting-Gang Chen, Bo-Yu Huang, Hsiao-Wei Liu, Yang-Yue Huang, Huai-Te Pan, Hsin-Fei Meng, and Peichen Yu, "Flexible Silver Nanowire Meshes for High-Efficiency Microtextured Organic-Silicon Hybrid Photovoltaics," ACS Applied Materials & Interfaces, 2012, 4 (12), 6857-6864.
7. Taegeon Kim, Ali Canlier, Geun Hong Kim, Jaeho Choi, Minkyu Park, and Seung Min Han, "Electrostatic Spray Deposition of Highly Transparent Silver Nanowire Electrode on Flexible Substrate, ACS Appl. Mater. Interfaces, Article ASAP; DOI: 10.1021/am3023543.
8. Yumi Ahn, Youngjun Jeong, and Youngu Lee, "Improved Thermal Oxidation Stability of Solution-Processable Silver Nanowire Transparent Electrode by Reduced Graphene Oxide," ACS Applied Materials & Interfaces, 2012, 4 (12), 6410-6414.
9. Gruner; George; Hu; Liangbing; and Hecht; David; "Graphene Film as Transparent and Electrically Conductive Material," US Patent Pub. No. 2007/0284557 (Dec. 13, 2007).
10. Hu; Liangbing and Gruner; George; "Touch Screen Devices Employing Nanostructure Network," US Patent Pub. No. 2008/0048996 (Feb. 28, 2008).
11. Gruner; George; Hu; Liangbing; and Hecht; David; "Graphene Film as Transparent and Electrically Conductive Material," US Patent Pub. No. 2009/0017211 (Jan. 15, 2009).
12. Eda, G.; Fanchini, G.; Chhowalla, M. "Large-Area Ultrathin Films of Reduced Graphene Oxide as a Transparent and Flexible Electronic Material. Nat. Nanotechnol. 2008, 3, 270-274.
13. Wang, Xuan; Zhi, Linjie; Mullen, K. "Transparent, Conductive Graphene Electrodes for Dye-Sensitized Solar Cells. Nano Lett. 2008, 8, 323.
14. Wu, J. B.; Agrawal, M.; Becerril, H. A.; Bao, Z. N.; Liu, Z. F.; Chen, Y. S.; Peumans, P. "Organic Light-Emitting Diodes on Solution-Processed Graphene Transparent Electrodes," ACS Nano 2009, 4, 43-48.
15. De, S.; Coleman, J. N. "Are There Fundamental Limitations on the Sheet Resistance and Transparence of Thin Graphene Films?" ACS Nano, 2010 May 25; 4(5), pp. 2713-20.
16. Kim, K. S.; Zhao, Y.; Jang, H.; Lee, S. Y.; Kim, J. M.; Kim, K. S.; Ahn, J.-H.; Kim, P.; Choi, J.-Y.; Hong, B. H. "Large-Scale Pattern Growth of Graphene Films for Stretchable Transparent Electrodes," Nature, 2009, 457, 706-710.
17. Li, X. S.; Zhu, Y. W.; Cai, W. W.; Borysiak, M.; Han, B. Y.; Chen, D.; Piner, R. D.; Colombo, L.; Ruoff, R. S. "Transfer of Large-Area Graphene Films for High-Performance Transparent Conductive Electrodes," Nano Lett. 2009, 9, 4359-4363.
18. Reina, A.; Jia, X. T.; Ho, J.; Nezich, D.; Son, H. B.; Bulovic, V.; Dresselhaus, M. S.; Kong, J. "Large Area, Few-Layer Graphene Films on Arbitrary Substrates by Chemical Vapor Deposition," Nano Lett. 2009, 9, 30-35.
19. Sukang Bae, Hyeongkeun Kim, Youngbin Lee, Xiangfan Xu, Jae-Sung Park, Yi Zheng, Jayakumar Balakrishnan, Tian Lei, Hye Ri Kim, Young Il Song, Young-Jin Kim, Kwang S. Kim, Barbaros O" zyilmaz, Jong-Hyun Ahn, Byung Hee Hong, and Sumio Iijima, "Roll-to-roll production of 30-inch graphene films for transparent electrodes," Nature Nanotechnology, Vol. 5, August 2010, 574-578.
20. Tung, V. C.; Chen, L. M.; Allen, M. J.; Wassei, J. K.; Nelson, K.; Kaner, R. B.; Yang, Y. Low-Temperature Solution Processing of Graphene-Carbon Nanotube Hybrid Materials for High-Performance Transparent Conductors. Nano Lett. 2009, 9, 1949-1955.
21. I. N. Kholmanov, et al. "Improved Electrical Conductivity of Graphene Films Integrated with Metal Nanowires," Nano Letters, 2012, 12 (11), pp 5679-5683.

Optically transparent and electrically conductive electrodes are widely implemented in optoelectronic devices, such as photovoltaic (PV) or solar cells, light-emitting diodes, organic photo-detectors, and various display devices. For use in these applications, the electrode materials must exhibit both exceptionally high optical transmittance and low sheet resistance (or high electrical conductivity). More commonly used transparent and conductive oxides (TCO) for the electrodes in these devices include (a) indium tin oxide (ITO), which is used for organic solar cells and light-emitting diodes, and (b) Al-doped ZnO, which is used in amorphous solar cells. There are some alternatives to these TCO that are being considered, such as single-walled carbon nanotubes (CNT), graphene, and metal or metal nanowires (NW).

Discrete carbon nanotubes may be used to form a thin film of highly porous network (or mesh) of electron-conducting paths on an optically transparent substrate, such as glass or polymer (e.g., polyethylene terephthalate, PET or polycarbonate). The empty spaces between nanotubes allow for light transmission and the physical contacts between nanotubes form the required conducting paths [Refs. 1-3]. However, there are several major issues associated with the use of CNTs for making a transparent conductive electrode (TCE). For instance, a higher CNT content leads to a higher conductivity, but lower transmittance due to a lower amount of empty spaces. Further, the sheet resistances of CNT-based electrodes are dominated by the large CNT junction resistances due to the mixed carbon nanotube varieties, with $1/3$ being metallic and $2/3$ semiconducting. As a result, a typical sheet resistance of CNT networks on a plastic substrate is 200-1,000 ohms/square ($\Omega/\square$) at an optical transmittance of 80-90%. The relatively high sheet resistance, compared with the approximately 10-50 ohms/square of high-end ITO on a plastic substrate, is far from being adequate for the practical application of transparent CNT electrodes in current-based devices, such as organic light emitting diodes and solar cells. Furthermore, an optical transmittance of >90% is generally required for these devices. Even for voltage-driven devices, such as capacitive touch screens, electro-wetting displays, and liquid crystal displays, a relatively low sheet resistance is highly desirable.

Metal nanowire mesh-based conductive and transparent films are also being considered as a potential replacement for ITO [Refs. 4-8]. However, metal nanowires also suffer from the same problems as CNTs. For instance, although individual metal nanowires (e.g. Ag nanowires) can have a high electrical conductivity, the contact resistance between metal nanowires can be significant. Additionally, although Ag nanowire films can show good optical and electrical performance, it has been difficult to make Ag nanowires into a free-standing thin film or a thin film of structural integrity coated on a substrate. In particular, Ag nanowire films that are deposited on a plastic substrate exhibit unsatisfactory flexibility and mechanical stability in that the nanowires can easily come off. Also, the surface smoothness is poor (surface roughness being too large).

Furthermore, all metal nanowires still have a long-term stability issue, making them unacceptable for practical use. When Ag nanowire films are exposed to air and water, Ag nanowires can be easily oxidized, leading to sharp increase in sheet resistance and haziness of the films. Ahn, et al [Ref. 8] disclosed the deposition of a reduced graphene oxide (RGO) layer or multiple RGO layers to a pre-fabricated Ag nanowire layer. The intent was to protect the underlying Ag nanowire film, but this approach can introduce additional issues to the film, e.g. significantly reduced optical transmittance by carrying out multiple coating passes and increased sheet resistance (when the Ag nanowire film was coated with more than 3 passes).

Graphene is yet another potential alternative to ITO. An isolated plane of carbon atoms organized in a hexagonal lattice is commonly referred to as a single-layer graphene sheet. Few-layer graphene refers to a stack of up to 5-10 planes of hexagonal carbon atoms bonded along the thickness direction with van der Waals forces. The generally good optical transparency and good electrical conductivity of graphene have motivated researchers to investigate graphene films for transparent and conductive electrode (TCE) applications [Refs. 9-21].

For instance, Gruner et al [Refs. 9-11] suggested a transparent and conductive film comprising at least one network of "graphene flakes," which are actually very thick graphite flakes. A suspension of graphite flakes in a solvent was deposited onto a transparent glass, allowing isolated graphite flakes to somehow overlap one another to form a mesh (e.g. FIG. 1 of Ref 9 and FIG. 1 of Ref. 11). The empty spaces between graphite flakes permit the light to pass through. However, these films typically exhibit a sheet resistance as high as 50 kOhm/square ($5 \times 10^4 \Omega/\square$) at 50% transparency. The low transparency is a result of using thick graphite flakes, not graphene sheets. Gruner et al then attempted to improve the film performance by combining carbon nanotubes and graphite flakes to form an interpenetrating network of conductive pathways (e.g. FIG. 2 of Ref. 9 and FIG. 2 of Ref. 11). Unfortunately, the interpenetrating network of graphite flakes and carbon nanotubes lead to a film that is only 80% transparent at 2 kOhms/square or 65% transparent at 1 kOhms/square (e.g., paragraph [0026] in both Ref. 9 and Ref. 11). These values are absolutely unacceptable to the TCE industry.

In a graphene film made by metal-catalyzed chemical vapor deposition (CVD), each graphene plane loses 2.3-2.7% of the optical transmittance and, hence, a five-layer graphene sheet or a film with five single-layer graphene sheets stacked together along the thickness direction would likely have optical transmittance lower than 90%. Unfortunately, single-layer or few layer graphene films, albeit optically transparent, have a relatively high sheet resistance, typically $3 \times 10^2 - 10^5$ Ohms/square (or 0.3-100 k$\Omega/\square$). The sheet resistance is decreased when the number of graphene planes in a film increases. In other words, there is an inherent tradeoff between optical transparency and sheet resistance of graphene films: thicker films decrease not only the film sheet resistance but also the optical transparency.

A recent study [Ref. 19] has demonstrated that single-layer CVD graphene films can have sheet resistances as low as ~125$\Omega/\square$ with 97.4% optical transmittance. However, the sheet resistance is still lower than desirable for certain applications. The authors further used layer-by-layer stacking to fabricate a doped four-layer film that shows sheet resistance at values as low as ~30$\Omega/\square$ at ~90% transparency, which is comparable to those of certain ITO grades. However, the layer-by-layer procedure is not amenable to mass production of transparent conductive electrodes for practical uses. Doping also adds an extra level of complexity to an already highly complex and challenging process that requires a tight vacuum or atmosphere control. The CVD process and equipment are notoriously expensive. Strong and urgent needs exist for more reliable and lower-cost processes and/or TCE materials that exhibit outstanding performance (e.g. sheet resistance <30-40$\Omega/\square$, yet still maintaining a transparency no less than 90%).

Since both graphene and carbon nanotube (CNT) have carbon atoms as the primary element, it is perhaps appropriate to briefly discuss carbon-based materials at this juncture. Carbon is known to have five unique crystalline structures, including diamond, fullerene (0-D nano graphitic material), carbon nano-tube or carbon nano-fiber (1-D nano graphitic material), graphene (2-D nano graphitic material), and graphite (3-D graphitic material). The carbon nanotube (CNT) refers to a tubular structure grown with a single wall or multi-wall. Carbon nanotubes (CNTs) and carbon nanofibers (CNFs) have a diameter on the order of a few nanometers to a few hundred nanometers. Their longitudinal, hollow structures impart unique mechanical, electrical and chemical properties to the material. The CNT or CNF is a one-dimensional nano carbon or 1-D nano graphite material.

Bulk natural flake graphite is a 3-D graphitic material with each particle being composed of multiple grains (a grain being a graphite single crystal or crystallite) with grain boundaries (amorphous or defect zones) demarcating neighboring graphite single crystals. Each grain is composed of multiple graphene planes that are oriented parallel to one another. A graphene plane in a graphite crystallite is composed of carbon atoms occupying a two-dimensional, hexagonal lattice. In a given grain or single crystal, the graphene planes are stacked and bonded via van der Waal forces in the crystallographic c-direction (perpendicular to the graphene plane or basal plane). Although all the graphene planes in one grain are parallel to one another, typically the graphene planes in one grain and the graphene planes in an adjacent grain are different in orientation. In other words, the orientations of the various grains in a graphite particle typically differ from one grain to another.

The constituent graphene planes of a graphite crystallite can be exfoliated and extracted (or isolated) to obtain individual graphene sheets of carbon atoms provided the inter-planar van der Waals forces can be overcome. An isolated, individual graphene sheet of carbon atoms is commonly referred to as single-layer graphene. A stack of multiple graphene planes bonded through van der Waals forces in the thickness direction with an inter-graphene plane spacing of 0.3354 nm is commonly referred to as a multi-layer graphene. A multi-layer graphene platelet has up to 300 layers of graphene planes (<100 nm in thickness). When the platelet has up to 5-10 graphene planes, it is commonly referred to as "few-layer graphene" in the scientific community. Single-layer graphene and multi-layer graphene sheets are collectively called "nano graphene platelets" (NGPs). Graphene sheets/platelets or NGPs are a new class of carbon nano material (a 2-D nano carbon) that is distinct from the 0-D fullerene, the 1-D CNT, and the 3-D graphite.

Our research group pioneered the development of graphene materials and related production processes as early as 2002: (1) B. Z. Jang and W. C. Huang, "Nano-scaled Graphene Plates," U.S. Pat. No. 7,071,258 (Jul. 4, 2006), application submitted on Oct. 21, 2012; (2) B. Z. Jang, et al. "Process for Producing Nano-scaled Graphene Plates," U.S. patent application Ser. No. 10/858,814 (Jun. 3, 2004) (U.S. Pat. Pub. No. 2005/0271574) (now abandoned); and (3) B. Z. Jang, A. Zhamu, and J. Guo, "Process for Producing Nano-scaled Platelets and Nanocomposites," U.S. patent application Ser. No. 11/509,424 (Aug. 25, 2006) (U.S. Pat. Pub. No. 2008/0048152) (now abandoned).

It may be noted that NGPs include discrete sheets/platelets of single-layer and multi-layer pristine graphene, graphene oxide, or reduced graphene oxide with different oxygen contents. Pristine graphene has essentially 0% oxygen. Graphene oxide (GO) has 0.01%-46% by weight of oxygen and reduced graphene oxide (RGO) has 0.01%-2.0% by weight of oxygen. In other words, RGO is a type of GO having lower but non-zero oxygen content. Additionally, both GO and RGO contain a high population of edge- and surface-borne chemical groups, vacancies, oxidative traps, and other types of defects, and both GO and RGO contain oxygen and other non-carbon elements, e.g. hydrogen [Ref. 14; J. B. Wu, et al]. In contrast, the pristine graphene sheets are practically defect-free and contain no oxygen. Hence, GO and RGO are commonly considered in the scientific community as a class of 2-D nano material that is fundamentally different and distinct from pristine graphene.

It may be further noted that CVD graphene films, although relatively oxygen-free, tend to contain a significant amount of other non-carbon elements, such as hydrogen and nitrogen. CVD graphene is polycrystalline and contains many defects, e.g., grain boundaries, line defects, vacancies, and other lattice defects, such as those many carbon atoms that are arranged in pentagons, heptagons or octagons, as opposed to the normal hexagon). These defects impede the flow of electrons and phonons. For these reasons, the CVD graphene is not considered as pristine graphene in the scientific community.

Pristine graphene can be produced by direct ultrasonication or liquid phase production, supercritical fluid exfoliation, alkali metal intercalation and water-induced explosion, or more expensive epitaxial growth. Pristine graphene is normally single-grain or single-crystalline, having no grain boundaries. Further, pristine graphene essentially does not contain oxygen or hydrogen. However, if so desired, the pristine graphene can be optionally doped with a chemical species, such as boron or nitrogen, to modify its electronic and optical behavior in a controlled manner.

A hybrid material containing both graphene oxide and CNT was formed into a thin film by Tung et al [Ref. 20], but the film does not exhibit a satisfactory balance of optical transparency and electrical conductivity. The highest performance film shows optical transmittance of 92%, but this is achieved at an unacceptable sheet resistance of 636Ω/□. The film with the lowest sheet resistance (240Ω/□ with un-doped RGO) shows 60% optical transmittance, which is not useful at all. The graphene component was prepared from heavily oxidized graphite and then intensely reduced with hydrazine.

Another hybrid material, containing non-pristine graphene (obtained by CVD) and silver nanowires, was formed into a film [Ref. 22]. Again, CVD-grown graphene is a polycrystalline material (not single-crystalline and not pristine) with many topological defects, such as non-hexagonal carbon atoms, vacancies, dislocations, and grain boundaries. Grain boundaries in graphene are line defects at the interfaces between two domains with different crystallographic orientations. Due to the processing conditions inherent to the CVD process, the CVD graphene also contains non-carbon elements (e.g. hydrogen). All these characteristics (defects and impurities) can significantly impede the transport of electrons and phonons in CVD graphene films. Even with the help from silver nanowires, the best CVD graphene-AgNW hybrid film exhibits a sheet resistance value that is still far away from what can be theoretically achieved with graphene alone [Ref. 22]. Besides, CVD processes are slow and expensive.

As discussed above, the CNT mesh, metal nanowire mesh, CVD graphene film, GO film (including RGO film), CNT-graphite flake mesh, CNT-graphene oxide (GO) hybrid, and RGO-protected Ag nanowire mesh have been proposed to serve as a transparent and conductive electrode, but none has met the stringent combined requirements of transparency, conductivity, oxidation resistance or long-term stability, mechanical integrity and flexibility, surface quality, chemical purity, process ease, and low cost.

Thus, it is an object of the present disclosure to provide a pristine graphene-based or pristine graphene-enabled hybrid film that meets most or all of the aforementioned requirements. The pristine graphene is oxygen-free, hydrogen-free, and grain boundary-free (single-grain or single-crystalline).

It is another object of the present disclosure to provide a process for producing a pristine graphene-based or pristine graphene-enabled hybrid film that is a variable alternative to ITO.

SUMMARY

The present disclosure provides an optically transparent and electrically conductive film composed of metal nanowires (and/or carbon nanotubes) and pristine graphene with a metal nanowire-to-graphene weight ratio or nanotube-to-graphene ratio of from 1/99 to 99/1, wherein the pristine graphene contains no oxygen and no hydrogen, and the film exhibits an optical transparence no less than 80% and sheet resistance no higher than 300 ohm/square.

Normally, a pristine graphene is a single-grain or single-crystalline structure of hexagonal carbon atoms wherein the graphene plane is essentially defect-free except at the graphene plane edges. The pristine graphene normally does not contain any non-carbon atoms (e.g. oxygen and hydrogen). The pristine graphene is fundamentally distinct from the CVD graphene, which is polycrystalline and inherently has a significant amount of non-carbon atoms chemically bonded thereto. Moreover, the CVD graphene contains many defects, e.g., grain boundaries, line defects, vacancies, and other lattice imperfections, such as those many carbon atoms that are arranged in pentagons, heptagons, or octagons, as opposed to the normal hexagon in pristine graphene. The term "pristine graphene" as claimed in the instant application logically excludes the CVD graphene.

The pristine graphene used herein is typically single-layer or few-layer graphene (up to 10 planes of carbon atoms, but more typically up to 5 planes). It is important to point out that the number of graphene planes of atoms (i.e. the number of hexagonal planes of carbon atoms) in a graphene platelet is an essential factor that differentiates one type of graphene from another type. A single-layer graphene is a semi-metal with a zero energy gap. A double-layer graphene sheet/platelet is a semiconductor with a non-zero energy gap. As the number of graphene planes increases from 3 to 10 layers, the graphene material is transitioned from a semiconductor to a metal (or conductor). Hence, single-layer graphene, double-layer graphene, few-layer graphene (3-10 layers), and thicker graphene platelets (>10 layers) are all considered as distinct and different types of materials in scientific community.

Preferably and typically, the thin film of hybrid pristine graphene-metal nanowires exhibits an optical transparence no less than 85% and sheet resistance no higher than 100 ohm/square. More preferably and more typically, the film exhibits an optical transparence no less than 85% and sheet resistance no higher than 40 ohm/square (preferably no higher than 30 ohm/square). Still more preferably and typically, the film exhibits an optical transparence no less than 90% and sheet resistance no higher than 100 ohm/square (preferably no higher than 40 ohm/square and further preferably no higher than 30 ohm/square). In many cases, the film exhibits an optical transparence no less than 95% at a sheet resistance no higher than 100 ohm/square (often no higher than 40 ohm/square and some even less than 30 ohm/square).

Most surprisingly, some of our best films achieve a sheet resistance of 54 ohm/square at 95% transparence and 43 ohm/square at 97% transparency. The lowest sheet resistance achieved thus far has been 8 ohm/square. These performance levels are unprecedented and have exceeded the very best values of all graphene or graphene-based hybrid material films ever reported. These values are comparable or superior to those of ITO-based films and graphene-based films are flexible, durable, mechanical strong, environmentally stable, and potentially much less expensive.

For the purpose of defining the claim languages, the "metal nanowire" in the instant application refers to an elongated metal nanostructure having a largest dimension (e.g. length) and a smallest dimension (e.g. thickness or diameter) wherein the largest dimension-to-smallest dimension ratio is no less than 3 and the smallest dimension is no greater than 200 nm (preferably no greater than 100 nm). The metal nanowire refers to a metal nanostructure having a rod, wire, sheet, belt, or tube shape that meets the aforementioned dimension requirements. In other words, the metal nanowire can include nano-rod, nano-wire, nano-sheet, nano-belt, or nano-tube.

In a preferred embodiment, the metal nanowires are selected from nanowires of silver (Ag), gold (Au), copper (Cu), platinum (Pt), zinc (Zn), cadmium (Cd), cobalt (Co), molybdenum (Mo), aluminum (Al), an alloy thereof, or a combination thereof. Particularly desired metal nanowires are silver nanowires, but metal nanowires may be selected from nanowires of a transition metal or an alloy of a transition metal.

The optically transparent and electrically conductive film may be a free-standing film or supported on a transparent substrate. In a preferred configuration, the film is supported on a transparent substrate and the mesh or meshes of metal nanowires are disposed between the pristine graphene and the transparent substrate. The mesh or meshes of metal nanowires may be embedded in the pristine graphene or supported on the pristine graphene. The hybrid metal nanowire/pristine graphene-based optically transparent and electrically conductive film may further contain carbon nanotubes or carbon nano-fibers.

Another preferred embodiment of the present disclosure is an optically transparent and electrically conductive film composed of a mesh or meshes of carbon nanotubes and pristine graphene with a carbon nanotube-to-graphene weight ratio of from 1/99 to 99/1, wherein the pristine graphene contains no oxygen and no hydrogen, and the film exhibits an optical transparence no less than 80% and sheet resistance no higher than 300 ohm/square (typically no higher than 200 ohm/square). The pristine graphene can contain single-layer, double-layer, or few-layer graphene sheets (up to 10 layers), each having one single grain.

Typically and preferably, the hybrid CNT/pristine graphene-based film exhibits an optical transparence no less than 85% and sheet resistance no higher than 200 ohm/square (often no higher than 100 ohm/square and even less than 50 ohm/square). In many cases, the hybrid film exhibits an optical transparence no less than 90% while maintaining a sheet resistance no higher than 300 ohm/square (often no higher than 200 or even 100 ohm/square). In some examples, the hybrid film exhibits an optical transparence no less than 95% while maintaining a sheet resistance lower than 200 ohm/square.

The hybrid CNT/pristine graphene-based optically transparent and electrically conductive film may be a freestanding film, or may be supported on a transparent substrate. Preferably, the mesh or meshes of carbon nanotubes are disposed between the pristine graphene and the transparent substrate. Alternatively, the mesh or meshes of carbon nanotubes may be embedded in the pristine graphene or simply supported on the pristine graphene.

The present disclosure also provides a process for producing the optically transparent and electrically conductive film described above. The process comprises: (a) preparing a solution or suspension of pristine graphene in a liquid medium; (b) dispersing metal nanowires or carbon nanotubes into the solution or suspension to form a "mixture dispersion"; (c) dispensing and depositing the mixture dispersion at a controlled rate onto a supporting substrate; and (d) removing the liquid medium from the mixture dispersion deposited on the supporting substrate to form the desired optically transparent and electrically conductive film.

Another embodiment of the present disclosure is a process for producing an optically transparent and electrically conductive film. The process comprises: (a) preparing a first solution or suspension of pristine graphene in a first liquid medium; (b) preparing a second suspension of metal nanowires or carbon nanotubes in a second liquid medium; (c) dispensing and depositing the first solution or suspension and the second suspension, concurrently or sequentially, at a controlled rate onto a supporting substrate; and (d) removing the first liquid medium and the second liquid medium to form the optically transparent and electrically conductive film. In a preferred embodiment, step (c) includes dispensing and depositing the second suspension prior to dispensing and depositing the first suspension to produce a layer of metal nanowires or carbon nanotubes covered and protected by a layer of pristine graphene in the optically transparent and electrically conductive film.

DESCRIPTION OF THE PREFERRED EMBODIMENTS

A preferred embodiment of the present disclosure is an optically transparent and electrically conductive film composed of a mesh or meshes of metal nanowires and pristine graphene with a metal nanowire-to-graphene weight ratio of from 1/99 to 99/1, wherein the pristine graphene contains no oxygen and no hydrogen, and the film exhibits an optical transparence no less than 80% and sheet resistance no higher than 300 ohm/square. The film is thinner than 100 nm, more often thinner than 10 nm, even more often and preferably thinner than 2 nm, and can be as thin as 0.34 nm.

The two key components in this transparent and conductive film are metal nanowires (e.g. silver nanowires, AgNW) and pristine graphene.

Graphene normally refers to a sheet of carbon atoms that are arranged in a hexagonal lattice and the sheet is one carbon atom thick. This isolated, individual plane of carbon atoms is commonly referred to as single-layer graphene. A stack of multiple graphene planes bonded through van der Waals forces in the thickness direction with an inter-graphene plane spacing of 0.3354 nm is commonly referred to as a multi-layer graphene. A multi-layer graphene platelet has up to 300 layers of graphene planes (<100 nm in thickness). When the platelet has up to 5-10 graphene planes, it is commonly referred to as "few-layer graphene" in the scientific community. Single-layer graphene and multi-layer graphene sheets are collectively called "nano graphene platelets" (NGPs). Graphene sheets/platelets or NGPs are a new class of carbon nano material (a 2-D nano carbon) that is distinct from the 0-D fullerene, the 1-D CNT, and the 3-D graphite.

In the instant application and in keeping with commonly accepted definitions in scientific community, NGPs or graphene materials can include discrete sheets/platelets of single-layer and multi-layer pristine graphene, graphene oxide, or reduced graphene oxide with different oxygen contents. Pristine graphene has essentially 0% oxygen and 0% hydrogen. Graphene oxide (GO) has 0.01%-46% by weight of oxygen and reduced graphene oxide (RGO) has 0.01%-2.0% by weight of oxygen. In other words, RGO is a type of GO having lower but non-zero oxygen content. Additionally, both GO and RGO contain a high population of edge- and surface-borne chemical groups, vacancies, oxidative traps, and other types of defects, and both GO and RGO contain oxygen and other non-carbon elements, e.g. hydrogen. In contrast, the pristine graphene sheets are practically defect-free on the graphene plane and contain no oxygen. Hence, GO and RGO are commonly considered in the scientific community as a class of 2-D nano material that is fundamentally different and distinct from pristine graphene.

Figure 1A:
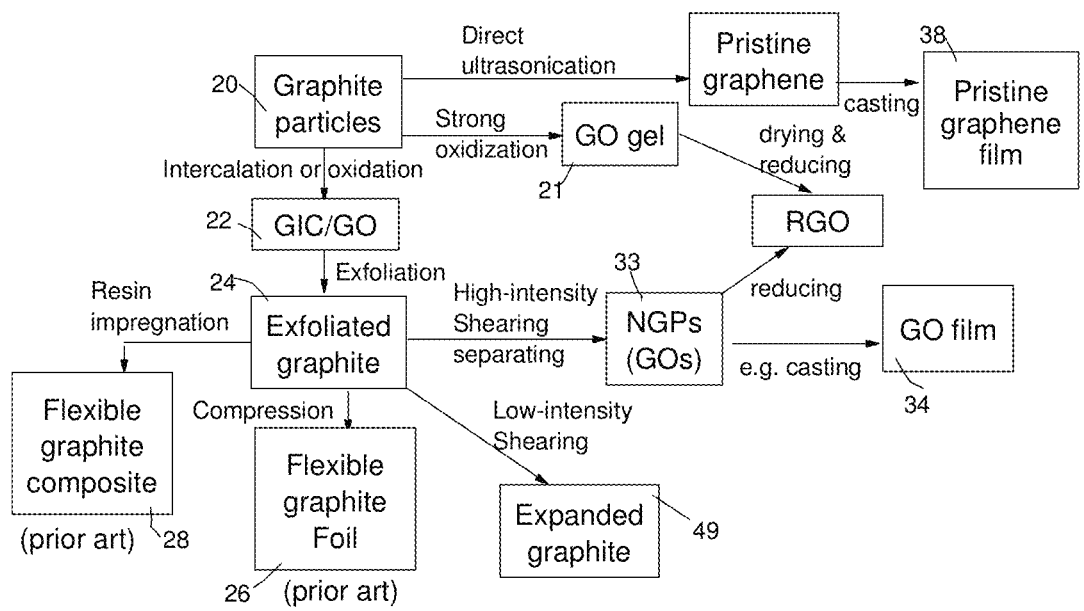
FIG. 1(a) A flow chart illustrating various prior art processes for producing nano graphene platelets (graphene oxide, reduced graphene oxide, and pristine graphene) and exfoliated graphite products (flexible graphite foils and flexible graphite composites).
Figure 1B:
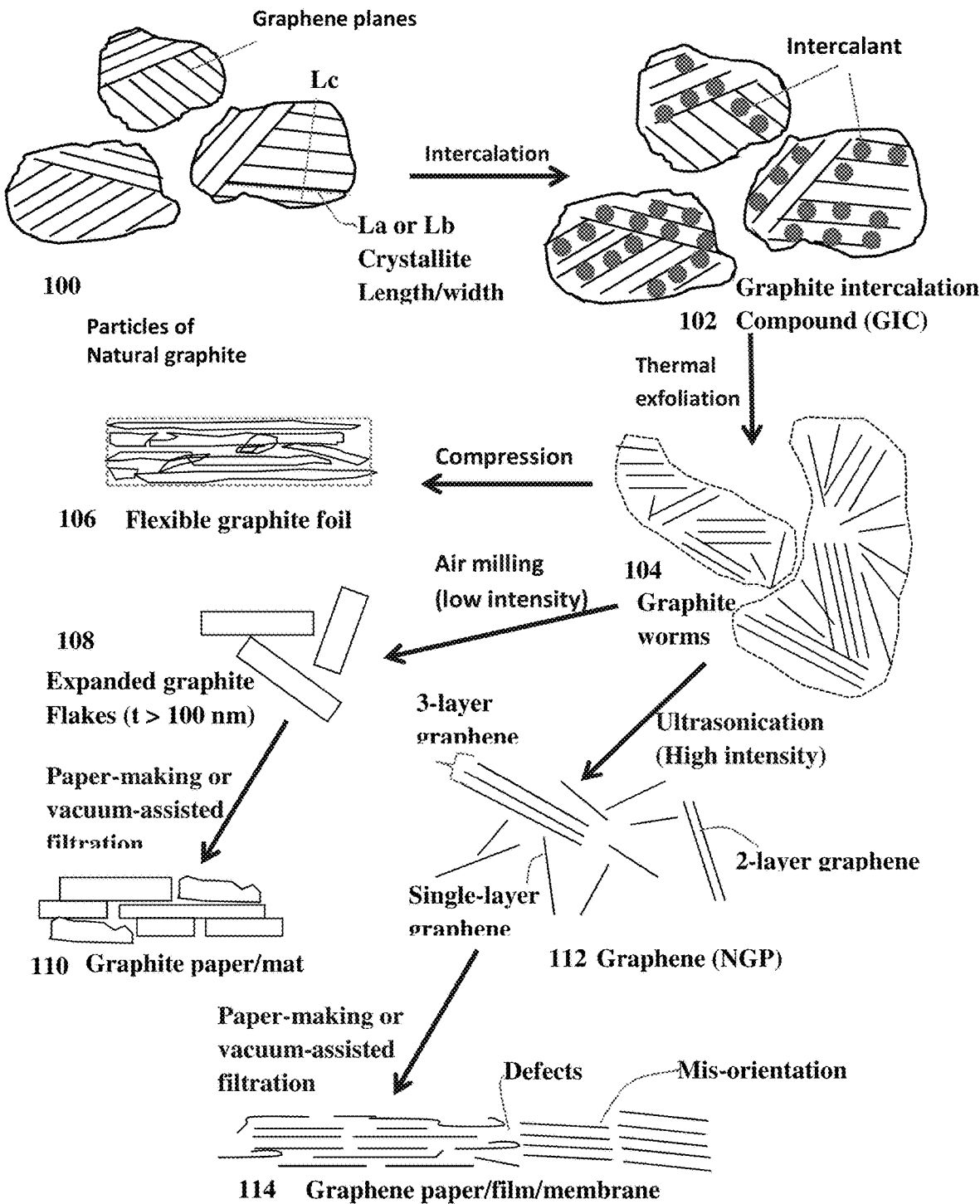
FIG. 1(b) Schematic drawing illustrating the processes for producing film or membrane of simply aggregated graphite or NGP flakes/platelets; all processes begin with intercalation and/or oxidation treatment of graphitic materials (e.g. natural graphite particles).

NGPs are commonly obtained by intercalating natural graphite particles with a strong acid and/or oxidizing agent to obtain a graphite intercalation compound (GIC) or graphite oxide (GO), as illustrated in FIG. 1(a) (process flow chart) and FIG. 1(b) (schematic drawing). The presence of chemical species or functional groups in the interstitial spaces between graphene planes serves to increase the inter-graphene spacing ($d_{002}$, as determined by X-ray diffraction), thereby significantly reducing the van der Waals forces that otherwise hold graphene planes together along the crystallographic c-axis direction. The GIC or GO is most often produced by immersing natural graphite powder (20 in FIGS. 1(a) and 100 in FIG. 1(b)) in a mixture of sulfuric acid, nitric acid (an oxidizing agent), and another oxidizing agent (e.g. potassium permanganate or sodium perchlorate). The resulting GIC (22 or 102) is actually some type of graphite oxide (GO) particles. Strong oxidation of graphite particles can result in the formation of a gel-like state called "GO gel" 21. The GIC 22 is then repeatedly washed and rinsed in water to remove excess acids, resulting in a graphite oxide suspension or dispersion, which contains discrete and visually discernible graphite oxide particles dispersed in water. There are two processing routes to follow after this rinsing step:

Route 1 involves removing water from the suspension to obtain "expandable graphite," which is essentially a mass of dried GIC or dried graphite oxide particles. Upon exposure of expandable graphite to a temperature in the range from typically 800-1,050° C. for approximately 30 seconds to 2 minutes, the GIC undergoes a rapid expansion by a factor of 30-300 to form "graphite worms" (24 or 104), which are each a collection of exfoliated, but largely un-separated graphite flakes that remain interconnected.

In Route 1A, these graphite worms (exfoliated graphite or "networks of interconnected/non-separated graphite flakes") can be re-compressed to obtain flexible graphite sheets or foils (26 or 106) that typically have a thickness in the range from 0.1 mm (100 µm)-0.5 mm (500 µm). Alternatively, one may choose to use a low-intensity air mill or shearing machine to simply break up the graphite worms for the purpose of producing the so-called "expanded graphite flakes" (49 or 108) which contain mostly graphite flakes or platelets thicker than 100 nm (hence, not a nano material by definition).

Exfoliated graphite worms, expanded graphite flakes, and the recompressed mass of graphite worms (commonly referred to as flexible graphite sheet or flexible graphite foil) are all 3-D graphitic materials that are fundamentally different and patently distinct from either the 1-D nano carbon material (CNT or CNF) or the 2-D nano carbon material (graphene sheets or platelets, NGPs). Flexible graphite (FG) foils and all the expanded graphite films are totally dark and opaque, not suitable for use as a transparent conductive electrode.

In Route 1B, the exfoliated graphite is subjected to high-intensity mechanical shearing (e.g. using an ultrasonicator, high-shear mixer, high-intensity air jet mill, or high-energy ball mill) to form separated single-layer and multi-layer graphene sheets (collectively called NGPs, 33 or 112), as disclosed in our U.S. application Ser. No. 10/858,814. Single-layer graphene can be as thin as 0.34 nm, while multi-layer graphene can have a thickness up to 100 nm. In the present application, the thickness of multi-layer NGPs is typically less than 20 nm. The NGPs (still containing oxygen) may be dispersed in a liquid medium and cast into a GO thin film 34.

Route 2 entails ultrasonicating the graphite oxide suspension for the purpose of separating/isolating individual graphene oxide sheets from graphite oxide particles. This is based on the notion that the inter-graphene plane separation has been increased from 0.3354 nm in natural graphite to 0.6-1.1 nm in highly oxidized graphite oxide, significantly weakening the van der Waals forces that hold neighboring planes together. Ultrasonic power can be sufficient to further separate graphene plane sheets to form separated, isolated, or discrete graphene oxide (GO) sheets. These graphene oxide sheets can then be chemically or thermally reduced to obtain "reduced graphene oxides" (RGO) typically having an oxygen content of 0.01%-10% by weight, more typically 0.01%-5% by weight, and most typically 0.01%-2.0% by weight of oxygen with heavy chemical reduction using a reducing agent like hydrazine.

It is important to further emphasize the fact that, in the typical prior art processes, ultrasonification is used after intercalation and oxidation of graphite (i.e., after first expansion) and most typically after thermal shock exposure of the resulting GIC or GO (i.e., after second expansion or exfoliation) to aid in breaking up those graphite worms. There are already much larger spacings between flakes after intercalation and/or after exfoliation (hence, making it possible to easily separate flakes by ultrasonic waves). This ultrasonication was not perceived to be capable of separating those un-intercalated/un-oxidized layers where the inter-graphene spacing remains <0.34 nm and the van der Waals forces remain strong.

The applicant's research group was the very first in the world to surprisingly observe that, under proper conditions (e.g., with an ultrasonic frequency and intensity and under the assistance of a certain type of surfactant), ultrasonication can be used to produce ultra-thin graphene directly from graphite, without having to go through chemical intercalation or oxidation. This disclosure was reported in a patent application [A. Zhamu, et al., "Method of Producing Exfoliated Graphite, Flexible Graphite, and Nano Graphene Plates," U.S. patent Ser. No. 11/800,728 (May 8, 2007); now U.S. Pat. No. 7,824,651 (Nov. 2, 2010)]. This "direct ultrasonication" process is capable of producing both single-layer and few-layer pristine graphene sheets. This innovative process involves simply dispersing pristine graphite powder particles 20 in a liquid medium (e.g., water, alcohol, or acetone) containing a dispersing agent or surfactant to obtain a suspension. The suspension is then subjected to an ultrasonication treatment, typically at a temperature between 0° C. and 100° C. for 10-120 minutes, resulting in ultra-thin pristine graphene sheets suspended in a liquid medium. The resulting suspension can be cast to form a pristine graphene film 38. No chemical intercalation or oxidation is required. The graphite material has never been exposed to any obnoxious chemical. This process combines expansion, exfoliation, and separation into one step. Hence, this simple yet elegant method obviates the need to expose graphite to a high-temperature, or chemical oxidizing environment. Upon drying, the resulting NGPs are essentially pristine graphene, containing no oxygen and no surface defects. These pristine graphene sheets, single-layer or multi-layer, are all highly conductive both electrically and thermally.

This direct ultrasonication process may be considered as peeling off graphene layers at a rate of 20,000 attempts per second (if the ultrasonic frequency is 20 kHz) or higher (if higher frequency) per each suspended graphite particle. The resulting NGPs are pristine graphene, being single-grain or single-crystalline and without any intentionally added or bonded oxygen or hydrogen. This is a powerful approach to large-scale preparation of pristine NGPs.

After additional research and development work, we further discovered that a surfactant is not needed if the graphite particles are mixed with a certain liquid or solvent that meets a specific surface energy requirement [A. Zhamu and Bor Z. Jang, U.S. Pat. No. 8,226,801, Jul. 24, 2012]. The resulting surfactant-free mixture of pristine graphitic particles (non-preintercalated, un-oxidized, un-fluorinated, etc.) and solvent is then subjected to direct ultrasonication. This improvement is significant since it eliminates the need to remove a surfactant from this liquid or solvent. The process is fast and environmentally benign. It can be easily scaled-up for mass production of highly conducting graphene. Again, it is important to emphasize that, in all prior art processes, ultrasonification was used after intercalation and oxidation of graphite (i.e., after first expansion) and, in most cases, after thermal shock exposure of the resulting GIC or GO (after second expansion). In contrast, the direct ultrasonication process does not involve pre-oxidizing or pre-intercalating the starting graphite particles.

In addition to the aforementioned direct ultrasonication, also referred to as liquid phase production, other processes can be used to produce pristine graphene. Examples are supercritical fluid exfoliation, graphite dissolution in select solvent (e.g. NMP), alkali metal intercalation and water-induced explosion, and more expensive epitaxial growth. The alkali metal intercalation route involves exposing graphite to an alkali metal melt or a molten mixture of two alkali metals (e.g. eutectic). This can be conducted at a temperature typically lower than 300° C., but in a highly controlled environment (e.g. inside a glovebox).

Normally, a pristine graphene is a single-grain or single-crystalline structure of hexagonal carbon atoms wherein the graphene plane is essentially defect-free except at the graphene plane edges. Further, the pristine graphene normally does not contain any non-carbon atoms (e.g. oxygen and hydrogen). The pristine graphene is fundamentally distinct from the CVD graphene, which is polycrystalline and inherently has a significant amount of non-carbon atoms chemically bonded thereto. Moreover, the CVD graphene contains many defects, e.g., grain boundaries, line defects, vacancies, and other lattice imperfections, such as those many carbon atoms that are arranged in pentagons, heptagons, or octagons, as opposed to the normal hexagon in pristine graphene. The term "pristine graphene" as claimed in the instant application inherently does not include the CVD graphene.

As indicated earlier, different types of NGPs have different oxygen contents. Pristine graphene has essentially 0% oxygen. Graphene oxide (GO) has 0.01%-46% by weight of oxygen and reduced graphene oxide (RGO) has 0.01%-2.0% by weight of oxygen. Both GO and RGO contains a high population of edge- and surface-borne chemical groups, vacancies, oxidative traps, and other types of defects, and both GO and RGO contain oxygen and other elements, e.g. hydrogen. Hence, GO and RGO are commonly considered in the scientific community as a class of 2-D nano material that is fundamentally different and distinct from pristine graphene. This distinction and difference in composition and structure is also reflected in many of their properties. For instance, GO is essentially an electrically insulating material. Even after heavy oxidation treatment, the resulting RGO still exhibits a relatively low electrical and thermal conductivity as compared to polycrystalline graphite. As an example, RGO thin films of approximate 10-30 nm thickness exhibit a typical electrical conductivity of 550-720 S/cm, even significantly lower than the 1,250 S/cm of polycrystalline graphite [Ref. 13; X. Wang, et al]. In contrast, the present study demonstrates that pristine graphene-based thin film sheets of comparable thickness exhibit an electrical conductivity of typically 5,000-15,000 S/cm. These pristine graphene sheets are practically defect-free, are single-crystalline, and contain no oxygen or hydrogen. The pristine graphene can be optionally doped with a chemical species, such as boron or nitrogen, to modify its electronic and optical behavior if so desired.

There are many processes, with or without a template, that can be used to produce metal nanowires, and these are well known in the art. A widely used approach to fabricate metal nanowires is based on the use of various templates, which include negative, positive, and surface step templates. Negative template methods use prefabricated cylindrical nano-pores in a solid material as templates. By depositing metals into the nano-pores, nanowires with a diameter predetermined by the diameter of the nano-pores are fabricated.

The positive template method uses wire-like nanostructures, such as DNA and carbon nanotubes as templates, and nanowires are formed on the outer surface of the templates. Unlike negative templates, the diameters of the nanowires are not restricted by the template sizes and can be controlled by adjusting the amount of materials deposited on the templates. By removing the templates after deposition, wire-like and tube-like structures can be formed.

Atomic-scale step edges on a crystal surface can be used as templates to grow nanowires. The method takes advantage of the fact that deposition of many materials on a surface often starts preferentially at defect sites, such as surface step-edges. For this reason, the method is sometimes called "step edge decoration." As examples, several research groups prepared metal nanowires on vicinal single crystal surfaces using the physical vapor deposition (PVD) method. Others fabricated metal nanowires of 1-2 atomic layer thick with a controlled "width" and wire spacing.

Metal nanowires, CNTs, and/or pristine graphene may be dispersed in a liquid medium with or without a surfactant to form a solution, suspension, or ink. The graphene-, metal nanowire-, CNT-, or hybrid-based films may be deposited from solution, suspension, or ink using a variety of methods, including spray painting, drop casting, spin coating, vacuum-assisted filtration, electrostatic deposition, and dip coating.

In a spray painting process, the solution/suspension/ink can be spray painted onto a heated or non-heated substrate. The substrate may be rinsed during the spraying process to remove the solubilization agent, or surfactant. The spraying solution/suspension/ink may be of any concentration. The substrate surface may be functionalized to aid in adhesion of the deposited species (i.e., metal nanowires, CNTs, and/or graphene). The spraying rate and the number of spraying passes may be varied to obtain different amounts of deposited species.

In a drop casting process, a drop of the solution/suspension/ink can be placed onto a substrate for a period of time. The substrate may be functionalized to enhance adhesion of deposited species. The substrate with graphene may be rinsed by appropriate solvents. Alternatively, the solution can be spin-coated along with an appropriate solvent to remove the surfactant simultaneously. In dip coating, the substrate can be dipped into the solution for a period of time. This may form patterned or random networks of graphene, graphene/nanowire, or graphene/nanotube hybrids. In a printing process, the graphene network may be transferred from one substrate to another by means of a stamp. The stamp may be made from Polydimethyl-siloxane (PDMS). The transfer can be aided by gentle heating (up to 100° C.) and pressure. In a vacuum filtration process, the solution/suspension/ink can be filtered through a porous membrane under the assistance of a vacuum pump. A film of graphene, graphene/nanowire, and graphene/nanotube is deposited on top of the filtering membrane. The film can be washed while on the filter with a liquid medium to remove surfactant, functionalization agents, or unwanted impurities.

It may be noted that, for a coating or casting process, one may deposit the metal nanowires or CNTs to form a film first, which can be supported on a substrate. A protective graphene film is then deposited onto the nanowire or nanotube film. Alternatively, one may choose to disperse nanowires and/or nanotubes into a graphene solution/suspension to form a suspension or ink. Then, the nanowires and/or nanotubes are co-deposited with graphene to form an integral layer of conductive species.

The following examples serve to provide the best modes of practice for the present disclosure and should not be construed as limiting the scope of the disclosure:

Example 1: Direct Ultrasonication Production of Pristine Graphene from Natural Graphite in a Low Surface Tension Medium As an example, five grams of natural graphite, ground to approximately 20 μm or less in sizes, were dispersed in 1,000 mL of n-Heptane to form a graphite suspension. An ultrasonicator tip was then immersed in the suspension, which was maintained at a temperature of 0-5° C. during subsequent ultrasonication. An ultrasonic energy level of 200 W (Branson 5450 Ultrasonicator) was used for exfoliation and separation of graphene planes from dispersed graphite particles for a period of 1.5 hours. The average thickness of the resulting pristine graphene sheets was 1.1 nm, having mostly single-layer graphene and some few-layer graphene.

Example 2: Preparation of Pristine Graphene from Natural Graphite in Water-Surfactant Medium Using Direct Ultrasonication As another example, five grams of graphite flakes, ground to approximately 20 μm or less in sizes, were dispersed in 1,000 mL of deionized water (containing 0.15% by weight of a dispersing agent, Zonyl® FSO from DuPont) to obtain a suspension. An ultrasonic energy level of 175 W (Branson 5450 Ultrasonicator) was used for exfoliation, separation, and size reduction for a period of 1.5 hour. This procedure was repeated several times, each time with five grams of starting graphite powder, to produce a sufficient quantity of pristine graphene for thin film deposition.

Example 3: Pristine Graphene from Meso-Carbon Micro-Beads (MCMBs)

Five grams of artificial graphite, MCMBs (supplied from Shanghai Shan Shan Tech Co.) with an average particle size of approximately 18 μm, were dispersed in 1,000 mL of benzene. An ultrasonic energy level of 250 W (Branson 5450 Ultrasonicator) was used for the exfoliation and separation of graphene planes for a period of 1.5 hours. The average thickness of the resulting NGPs was 3.2 nm. When a lower surface tension liquid (Perfluorohexane, surface tension of 11.91 mN/m and contact angle of 23 degrees) was used, the average NGP thickness was 0.61 nm, indicating that most of the pristine graphene sheets were single-layer graphene.

Example 4: Preparation of Pristine NGPs from Natural Graphite Particles and MCMBs Using Potassium Intercalation Natural graphite was obtained from Huadong Graphite Co., Qingdao, China. The first-stage intercalation compound, $KC_8$, was synthesized by adding a stoichiometric amount of potassium, 81.4 mg (0.0021 moles) to 200 mg (0.0167 moles) of graphite particles in a Pyrex tube capped with a stopcock. All transfers were carried out in a helium filled dry box. The reactant filled tube was evacuated, sealed and heated for 16 hours at 200° C. The compound formed was bright gold in color. The obtained GIC was poured into a mixture of ethanol and distilled water (50:50 by volume). The material turns from gold to black as the graphite got exfoliated and bubbling was observed, suggesting that hydrogen was produced. The resulting solution was basic due to the formation of potassium ethoxide. The dispersion of nano graphene sheets in aqueous ethanol solution was then allowed to settle. The solvent was decanted and the product washed several times with ethanol until a neutral pH was obtained. Removal of water led to pristine NGP powder. Another batch of samples was prepared from MCMBs following the same procedures.

Example 5: Preparation of Pristine NGPs Using Supercritical Fluids

A natural graphite sample (approximately 5 grams) was placed in a 100 milliliter high-pressure vessel. The vessel was equipped with security clamps and rings that enable isolation of the vessel interior from the atmosphere. The vessel was in fluid communication with high-pressure carbon dioxide by way of piping means and limited by valves. A heating jacket was disposed around the vessel to achieve and maintain the critical temperature of carbon dioxide.

High-pressure carbon dioxide was introduced into the vessel and maintained at approximately 1,100 psig (7.58 MPa). Subsequently, the vessel was heated to about 70° C. at which the supercritical conditions of carbon dioxide were achieved and maintained for about 3 hours, allowing carbon dioxide to diffuse into inter-graphene spaces. Then, the vessel was immediately depressurized "catastrophically' at a rate of about 3 milliliters per second. This was accomplished by opening a connected blow-off valve of the vessel. As a result, delaminated or exfoliated graphene layers were formed. This sample was found to contain pristine NGPs with an average thickness just under 10 nm.

Approximately two-thirds of the sample were subjected to another cycle of supercritical $CO_2$ intercalation and de-pressurization treatments (i.e., the above procedures were repeated), yielding much thinner NGPs with an average thickness of 2.1 nm. The specific surface area, as measured by the BET method, was approximately 430 $m^2/g$. TEM and AFM examinations indicated that there were many single-layer graphene sheets in this sample.

Another sample was prepared under essentially identical supercritical $CO_2$ conditions, with the exception that a small amount of surfactant (approximately 0.05 grams of Zonyl® FSO) was mixed with 5 grams of natural graphite before the mixture was sealed in the pressure vessel. The resulting NGPs have a surprisingly low average thickness, 3.1 nm. After the pressurization and de-pressurization procedures were repeated for another cycle, the resulting NGPs have an average thickness less than 1 nm, indicating that a majority of the NGPs are single-layer or double-layer sheets. The specific surface area of this sample after a repeated cycle was approximately 900 $m^2/g$. It is clear that the presence of a surfactant or dispersing agent promotes separation of graphene layers, perhaps by preventing the reformation of van der Waals forces between graphene sheets once separated.

Example 6: Thermal Exfoliation and Separation of Graphite Oxide

Graphite oxide was prepared by oxidation of graphite flakes with sulfuric acid, nitrate, and permanganate according to the method of Hummers [U.S. Pat. No. 2,798,878, Jul. 9, 1957]. Upon completion of the reaction, the mixture was poured into deionized water and filtered. The graphite oxide was repeatedly washed in a 5% solution of HCl to remove most of the sulfate ions. The sample was then washed repeatedly with deionized water until the pH of the filtrate was neutral. The slurry was spray-dried and stored in a vacuum oven at 60° C. for 24 hours. The interlayer spacing of the resulting laminar graphite oxide was determined by the Debye-Scherrer X-ray technique to be approximately 0.73 nm (7.3 Å).

Dried graphite oxide powder was then placed in a tube furnace maintained at a temperature of 1,050° C. for 60 minutes. The resulting exfoliated graphite was subjected to low-power ultrasonication (60 watts) for 10 minutes to break up the graphite worms and separate graphene oxide layers. Several batches of graphite oxide (GO) platelets were produced under identical conditions to obtain approximately 2.4 kg of oxidized NGPs or GO platelets. A similar amount of GO platelets was obtained and then subjected to chemical reduction by hydrazine at 140° C. for 24 hours. The GO-tohydrazine molecular ratio was from 1/5 to 5/1. The resulting products are RGOs with various controlled oxygen contents.

Example 7: Preparation of Thin Films from Silver Nanowires (AgNW), AgNW/RGO Hybrid, and AgNW/Pristine Graphene Hybrid Materials Silver nanowires were purchased from Seashell Technologies (La Jolla, CA, USA) as suspension in isopropyl alcohol with concentrations of 25 mg/ml. A small volume of dispersion was diluted down to approximately 1 mg/ml with isopropyl alcohol. This was subjected to half-an-hour sonication in a sonic bath. Then, this suspension was applied to a 50 mm×100 mm poly(ethylene terephthalate) (PET) substrates by a manually controlled wire-wound, i.e., pushing the suspension on top of the substrate with a rod.

In addition, AgNW films were prepared by spin-coating AgNW inks on glass substrates. To prepare AgNW films on glass substrates, we treated glass substrates with UV/Ozone to make hydrophilic surfaces for AgNW spin-coating. Then, AgNW ink was spin-coated on a glass substrate and then dried at 120° C. for 5 min. Several AgNW films were prepared by changing spin-coating speed from 250 to 2,000 rpm to investigate the effect of spin-coating speed on optical and electrical properties of AgNW films. Transparent electrode films of AgNW-RGO and AgNW-pristine graphene hybrid were also prepared in a similar manner. Separately, the AgNW-graphene hybrid transparent electrode films were prepared by coating RGO or pristine graphene onto the AgNW film.

Figure 2A:
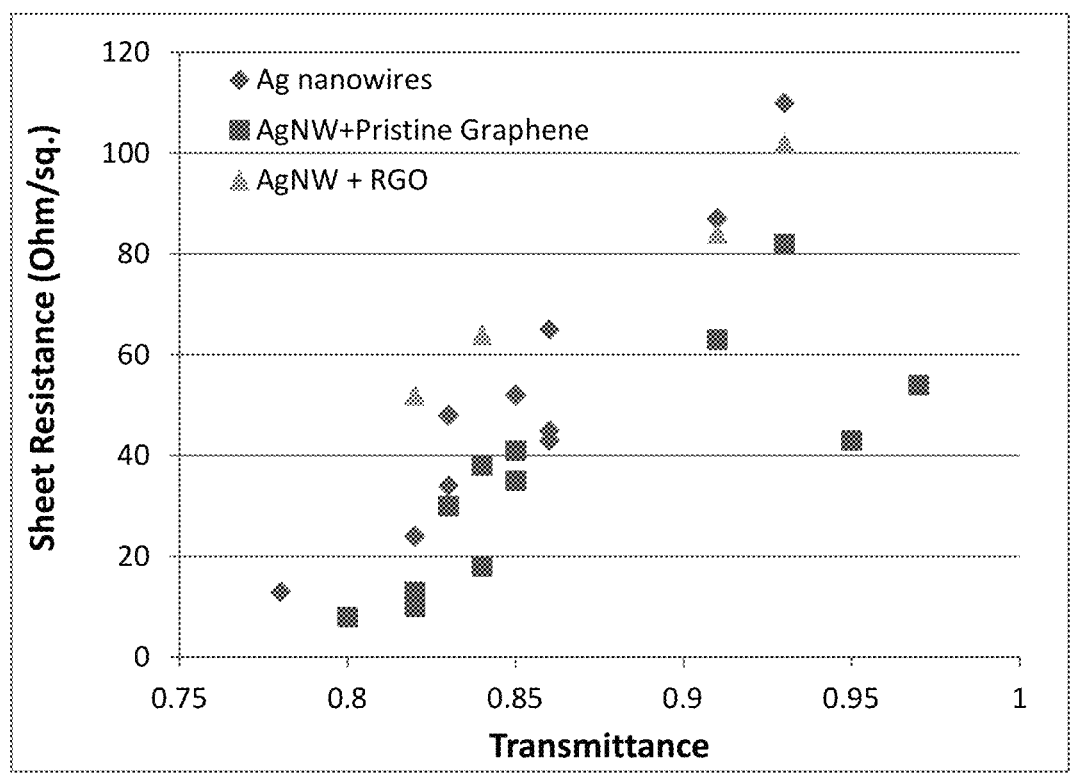
FIG. 2(a) Sheet resistance and optical transmittance, measured at 550 nm wavelength, of various AgNW, AgNW-RGO, and AgNW-pristine graphene films.
Figure 2B:
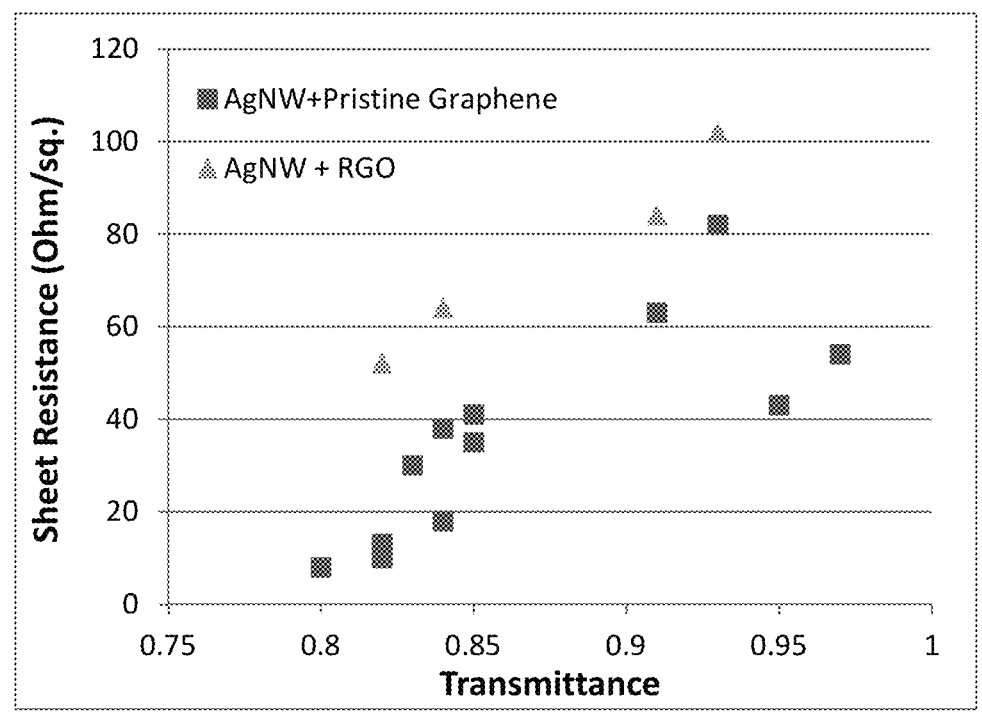
FIG. 2(b) Sheet resistance and optical transmittance of various AgNW/RGO and AgNW/pristine graphene films.

An UV/Vis/NIR was used to measure the optical transmittance of AgNW, AgNW-RGO, and AgNW-pristine graphene films. The sheet resistances were measured by a non-contact Rs measurement instrument. The sheet resistance and optical transparency data of thin films prepared from various different materials and conditions are summarized in FIG. 2(a) and FIG. 2(b). Several significant observations can be made from these figures: (A) The AgNW-pristine graphene films significantly out-perform both AgNW and AgNW-RGO films in terms of high transmittance and/or low sheet resistance. (B) With hybrid AgNW-pristine graphene films, we were able to achieve a sheet resistance value of 54 and 43Ω/□ at 95% and 97% transmittance, respectively. These values are superior to those of un-doped CVD graphene or CVD graphene-AgNW films. These outstanding combined performances are achieved by using highly scalable, more cost-effective, less tedious, and vacuum equipment-free processes. This is most surprising. (C) Sheet resistance values as low as 10 and 8Ω/□ have been obtained, which are comparable to or better than those of high-end ITO glass. These surprisingly low sheet resistance values were achieved at an optical transmittance higher than 80%.

Example 8: Fabrication of Organic Photovoltaic Devices with AgNW, AgNW-RGO, and AgNW-Pristine Graphene Transparent Electrodes To test the performance of AgNW-RGO film as the transparent electrode in an electro-optic device, we used AgNW, AgNW-RGO, and AgNW-pristine graphene films as anode layers in bulk heterojunction polymer solar cells as examples. First, an AgNW pattern for the anode layer was prepared onto a glass substrate by spin coating and a photolithography process. Then, for the AgNW-RGO and AgNW-pristine graphene transparent electrodes, patterned AgNW film was dipped into the aqueous solution of RGO or pristine graphene. The bulk heterojunction solar cells were then fabricated on the transparent electrode with a 30 nm of poly(3,4-ethylenedioxy thiophene):poly(styrenesulfonate) (PEDOT:PSS), 100 nm of a P3HT and PCBM blend with a 1:1 ratio, and LiF/Al cathode.

Further specifically, an AgNW transparent electrode was placed in an UV/O$_3$ chamber for 3 minutes and immediately spin-coated with a poly-3,4-ethyleneoxythiophene:poly-4-sytrensulfonate (PEDOT:PSS). The thickness of the spin-coated layer was approximately 20 nm, and then the PEDOT:PSS coated AgNW glass substrate was annealed on a hot plate for 10 min at 150° C. in a glove box. Poly(3-hexylthiophene) (P3HT) and [6,6]-phenyl-C61-butyric acid methyl ester (PCBM), which were blended in a weight ratio of 1:1, were dissolved in dichlorobenzene. Next, the P3HT: PCBM solution was spin-coated on top of the PEDOT:PSS layer and dried for 60 min at 50° C. and then annealed for 10 min at 100° C. in a glove box to form an active layer with a thickness of 100 nm. Lastly, a cathode layer composed of a LiF layer (1 nm) and an Al layer (120 nm) was deposited by thermal evaporation with the shadow mask in a high vacuum thermal evaporator (<10$^{-6}$ torr). The final products are the organic solar cell devices with a transparent electrode/PEDOT:PSS (30 nm)/P3HT:PCBM (100 nm)/LiF (1 nm)/Al (120 nm) configuration.

Figure 3:
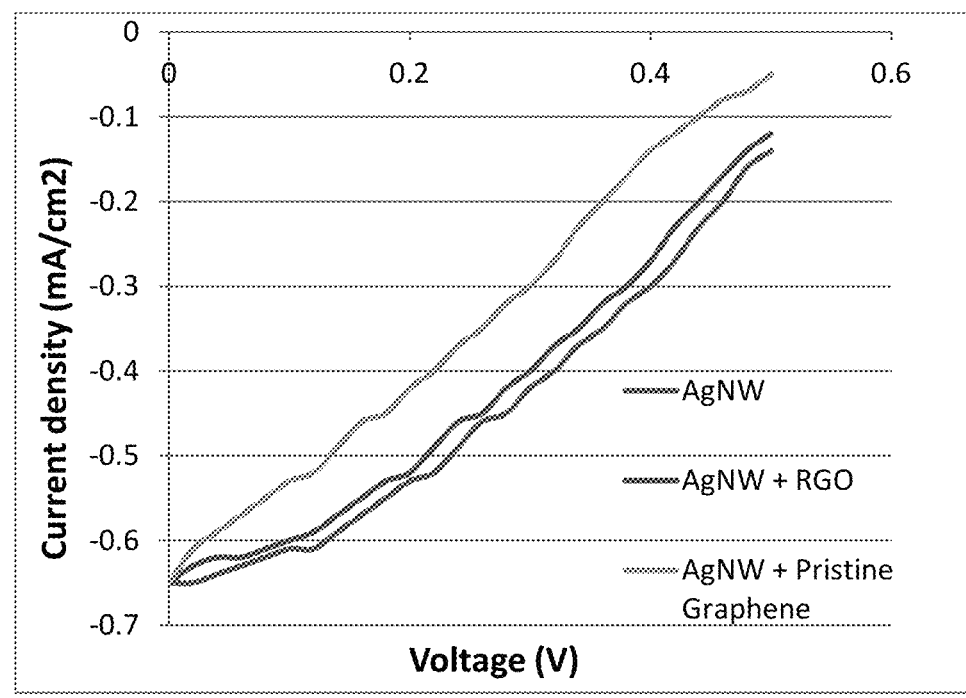
FIG. 3 The current density-voltage (J-V) characteristics of bulk heterojunction polymer solar cells with AgNW, AgNW-RGO, and AgNW-pristine graphene transparent electrodes under illumination.

The Current density-voltage (J-V) measurements of organic solar cell devices were performed under 100 mW/cm$^2$ AM 1.5 G illuminations. All measurements were carried out under ambient conditions at room temperature. FIG. 3 shows the current density-voltage (J-V) characteristics of bulk heterojunction polymer solar cells with AgNW, AgNW-RGO, and AgNW-pristine graphene transparent electrodes under illumination. The solar cells with AgNW-RGO transparent electrode show an open-circuit voltage ($V_{oc}$) of 0.49, short-circuit current density ($J_{sc}$) of 6.38 mA/cm$^2$, and fill factor (FF) of 32.95, resulting in power conversion efficiency (PCE) of 1.03%. The devices with the AgNW transparent electrode exhibit a PCE is 1.21% with a $V_{oc}$ of 0.49 V, a $J_{sc}$ of 6.45 mA/cm$^2$, and a FF of 38.26. In contrast, the devices with the AgNW/pristine graphene transparent electrode exhibit a PCE is 1.21% with a $V_{oc}$ of 0.49 V, a $J_{sc}$ of 6.75 mA/cm$^2$, and a FF of 38.95. This result clearly indicates that the solar cells with AgNW-pristine graphene transparent electrode out-perform those with an AgNW or AgNW-RGO transparent electrode.

Example 9: Copper Nanowire (CuNW) Film, RGO Film, CuNW/RGO Hybrid Film, Pristine Graphene Film, CuNW/Pristine Graphene Film In one preferred approach, the preparation of CuNW relied upon the self-catalytic growth of Cu nanowires within a liquid-crystalline medium of hexadecylamine (HAD) and cetyltriamoninum bromide (CTAB). First, HDA and CTAB were mixed at an elevated temperature to form a liquid-crystalline medium. Upon addition of the precursor, copper acetonetonate [Cu(acac)2], long nanowires with excellent dispersibility form spontaneously within the medium in the presence of a catalytic Pt surface.

Specifically, a solution process was followed to prepare copper nanowires (CuNWs). As an example, 8 g HAD and 0.5 g CTAB were dissolved in a glass vial at 180° C. Then, 200 mg copper acetylacetonate was added and magnetically stirred for 10 minutes. Subsequently, a silicon wafer (0.5 cm$^2$) sputtered with ~10 nm of platinum was placed into the vial. The mixtures were then maintained at 180° C. for 10 hours, resulting in the formation of reddish cotton-like sheets settled at the bottom. After rinsing with toluene for several times, the nanowires were dispersed in toluene at different solid contents. The suspensions were separately cast into thin films on glass or PET surface. Several CuNW films supported on glass or PET substrate were then deposited with either RGO film or pristine graphene film.

Figure 4:
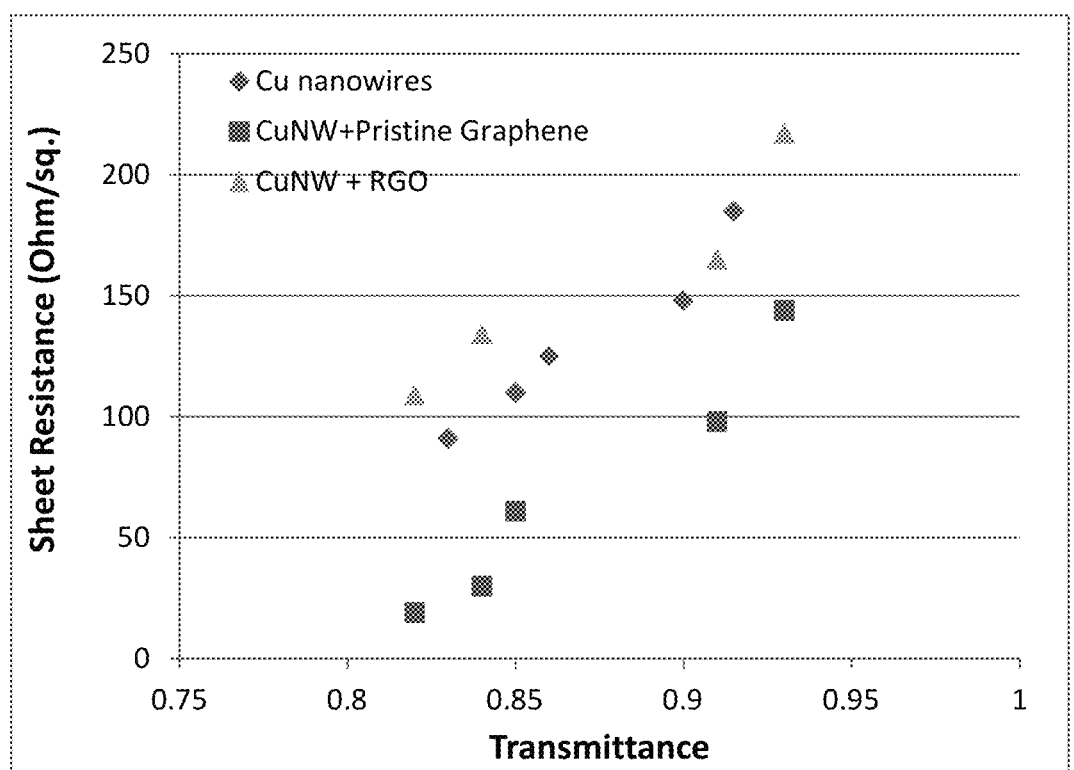
FIG. 4 Sheet resistance and optical transmittance, at 550 nm wavelength, of various CuNW, CuNW-RGO, and CuNW-pristine graphene thin films.

The sheet resistance and optical transparency data of these films are summarized in FIG. 4. Several significant observations can be made by examining the data from this chart: (A) The CuNW-pristine graphene films significantly outperform both CuNW and CuNW-RGO films in terms of high transmittance and/or low sheet resistance. (B) With hybrid CuNW-pristine graphene films, we were able to achieve a sheet resistance value of 144 and 98Ω/□ at 93% and 91% transmittance, respectively. These values are superior to those of all CuNW-based electrodes ever reported. These outstanding combined performances are achieved by using highly scalable, more cost-effective, less tedious, and vacuum equipment-free processes. (C) Sheet resistance values as low as 30 and 19Ω/□ have been obtained, which are comparable to those of ITO glass. These surprisingly low sheet resistance values were achieved at an optical transmittance of 82% and 84%, respectively. These are most impressive and surprising considering the fact that the electrical conductivity of Cu is an order of magnitude lower than that of silver and, hence, one would not have expected such a low sheet resistance associated with CuNW even when in combination with graphene, which is even lower than Cu in electrical conductivity.

Example 10: CNT Film, RGO Film, CNT/RGO Hybrid Film, Pristine Graphene Film, CNT/Pristine Graphene Film CNTs, RGO, pristine graphene, and their hybrid films were prepared using spin-coating. As an example, 5 mg of arc-discharged P3SWCNT (Carbon Solutions, Inc.) and 1 mg of graphite oxide paper were directly dispersed into a solution of 98% hydrazine (Sigma Aldrich) and allowed to stir for three days. All materials were used as received. Subsequent to stirring, the stable dispersion was centrifuged to separate out any CNT bundles and aggregated RGO particles. After centrifugation, uniformity of the dispersion was further ensured by heating to 60° C. with repeated ultrasonic agitation for 30 min. The resulting colloid was transferred into a nitrogen filled glove box for use in spin-coating.

For use as substrates, glass and PET films were cleaned in a combination of reagent grade acetone and isopropyl alcohol solution and pre-treated for 5 minutes by oxygen plasma in order to ensure good wetting by hydrazine. All substrates were transferred into the dry box and spin-coated within 15 minutes of this pre-treatment. After deposition, the films were heated to 115° C. to remove residual hydrazine. The sheet resistance and transmittance data of various transparent conductive films are shown in Table 1 below. Booth RGO and pristine graphene sheets used in the present study are single-layer or few layer graphene. These data indicate that thin films with combined pristine graphene-CNTs significantly out-perform CNT films, RGO films, and combined RGO-CNT films. The longstanding problem of high sheet resistance associated with CNT films, RGO films, and combined RGO-CNT films having a transmittance no less than 90% (an industry requirement) is now overcome.

TABLE 1

Sheet resistance and transmittance data of various transparent conductive films.

|  | CNT film | RGO | CNT/RGO | Pristine graphene (PG) | CNT/PG |
|---|---|---|---|---|---|
| | | | $1^{st}$ set of samples | | |
| Sheet resistance | 21 kΩ/□ | 475 kΩ/□ | 620 Ω/□ | 260 Ω/□ | 110 Ω/□ |
| Transmittance | 90% | 94% | 90% | 95% | 92% |
| | | | $2^{nd}$ set of samples | | |
| Sheet resistance | | | 5.82 kΩ/□ | | 210 Ω/□ |
| Transmittance | | | 92% | | 95% |

In summary, a novel and unique class of transparent and conductive electrodes has been developed. This new class of hybrid materials surprisingly offers the following special features and advantages:

(a) Thin films containing networks of metal NWs or carbon nanotubes combined with pristine graphene sheets prepared through solution processing techniques are a promising replacement to ITO glass due to their exceptionally high conductivity (low resistance) and optical transmittance. As an example, the superior performance of transparent pristine graphene-Ag NW electrodes on glass substrates and their use in organic solar cells have been demonstrated.

(b) Even though Cu has a much lower electrical conductivity as compared with silver, the CuNW-pristine graphene electrodes still surprisingly provide excellent combination of high optical transparency and low sheet resistance.

(c) Even though CNTs have a much lower electrical conductivity as compared with copper and silver, the CNT-pristine graphene electrodes still surprisingly provide excellent combination of high optical transparency and low sheet resistance suitable for a wide variety of electro-optical device applications.

(d) Pristine graphene (single-grain, oxygen-free, and hydrogen-free) is significantly more effective than reduced graphene oxide and CVD graphene in terms of imparting electrical conductance to the metal nanowire or carbon nanotube films without compromising the optical transmittance. This has been quite unexpected.

(e) The presently invented pristine graphene-AgNW films are particularly useful for organic optoelectronic devices such as organic photovoltaic (OPV) cells, organic light-emitting diodes, and organic photo-detectors because they can be deposited on flexible, light-weight substrates using low-cost fabrication methods.

(f) An important aspect of optoelectronic thin-film devices is the transparent, conductive electrode through which light couples in or out of the devices. Indium tin oxide (ITO) is widely used but may be too expensive for an application such as solar cells. Moreover, metal oxides such as ITO are brittle and therefore of limited use on flexible substrates. The present disclosure provides a substitute for ITO with a similar sheet resistance and transparency performance, but at a lower cost, higher flexibility, durability, and integrity.

(g) Graphene is a promising transparent conductor because of its unique optical and electrical properties. In principle, electrons in individual graphene sheets delocalize over the complete sheet, which provide ballistic charge transport in a one-atom-thick material with very little optical absorption. In practice, however, graphene films produced via CVD or via solution processing of graphene oxide (GO), reduced graphene oxide (RGO), and functionalized graphene contain multiple grain boundaries, lattice defects, oxidative traps, and/or other non-carbon elements that increase the electrical resistance of the material. The CVD graphene also inherently contains non-hexagonal carbons, which also impedes electron flow. As a result, the films must be made thicker than 1-4 atomic layer(s) to obtain practical sheet resistances. The use of pristine graphene, in combination with highly conductive metal nanowires or carbon nanotubes, has overcome this deficiency that has been a critically important yet challenging problem for quite some time.

We claim:

1. An optically transparent and electrically conductive film composed of a mixture of metal nanowires and carbon nanotubes combined with pristine graphene with a metal nanowire and carbon nanotube-to-graphene weight ratio of from 1/99 to 99/1, wherein said pristine graphene contains no oxygen and no hydrogen and is produced from graphite dissolution in a solvent, alkali metal intercalation, or supercritical fluid extraction, and said film exhibits an optical transparence no less than 80% and sheet resistance no higher than 200 ohm/square, wherein said film is supported on a transparent substrate.

2. The optically transparent and electrically conductive film of claim 1, wherein said pristine graphene contains single-layer graphene or few-layer graphene having less than 10 graphene planes of atoms.

3. The optically transparent and electrically conductive film of claim 1, wherein said film exhibits an optical transparence no less than 85% and sheet resistance no higher than 100 ohm/square.

4. The optically transparent and electrically conductive film of claim 1, wherein said film exhibits an optical transparence no less than 85% and sheet resistance no higher than 40 ohm/square.

5. The optically transparent and electrically conductive film of claim 1, wherein said film exhibits an optical transparence no less than 85% and sheet resistance no higher than 30 ohm/square.

6. The optically transparent and electrically conductive film of claim 1, wherein said film exhibits an optical transparence no less than 90% and sheet resistance no higher than 100 ohm/square.

7. The optically transparent and electrically conductive film of claim 1, wherein said film exhibits an optical transparence no less than 90% and sheet resistance no higher than 40 ohm/square.

8. The optically transparent and electrically conductive film of claim 1, wherein said film exhibits an optical transparence no less than 95% and sheet resistance no higher than 100 ohm/square.

9. The optically transparent and electrically conductive film of claim 1, wherein said film is supported on a transparent substrate and said metal nanowires or carbon nanotubes form a mesh or meshes that are disposed between said pristine graphene and said transparent substrate.

10. The optically transparent and electrically conductive film of claim 1, wherein said metal nanowires or carbon nanotubes are embedded in said pristine graphene or supported on said pristine graphene.

11. The optically transparent and electrically conductive film of claim 1, containing both metal nanowires and carbon nanotubes.

12. The optically transparent and electrically conductive film of claim 1, wherein said pristine graphene contains single-crystalline or single-grain graphene produced by direct ultrasonication, graphite dissolution in a solvent, alkali metal intercalation, or supercritical fluid extraction.

13. The optically transparent and electrically conductive film of claim 1, wherein said carbon nanotubes or said metal nanowires form a mesh or multiple meshes and said pristine graphene contains single-layer graphene or few-layer graphene, less than 10 graphene planes, each having a single grain and contains no oxygen and no hydrogen.

14. An electro-optic device containing an optically transparent and electrically conductive film composed of a mixture of metal nanowires and carbon nanotubes combined with pristine graphene with a metal nanowire and carbon nanotube-to-graphene weight ratio of from 1/99 to 99/1 as an electrode, wherein said pristine graphene is single-crystalline and contains no oxygen and no hydrogen, wherein said device is a solar cell, photo-detector, electro-wetting display, plasma display, LED display, a TV screen, a computer screen, or a mobile phone screen.

* * * * *